Aug. 1, 1944.　　　P. E. NOKES　　　2,354,767
AREA MEASURING MACHINE
Filed Aug. 25, 1941　　　4 Sheets-Sheet 1

INVENTOR
Philip E. Nokes
By his attorney

Aug. 1, 1944. P. E. NOKES 2,354,767
AREA MEASURING MACHINE
Filed Aug. 25, 1941 4 Sheets-Sheet 2

INVENTOR
Philip E. Nokes
By his attorney

Fig. 4.

Aug. 1, 1944.   P. E. NOKES   2,354,767
AREA MEASURING MACHINE
Filed Aug. 25, 1941   4 Sheets-Sheet 4

INVENTOR
Philip E. Nokes
By his attorney

Patented Aug. 1, 1944

2,354,767

UNITED STATES PATENT OFFICE 2,354,767

AREA MEASURING MACHINE

Philip E. Nokes, Beverly, Mass., assignor to United Shoe Machinery Corporation, Flemington, N. J., a corporation of New Jersey Application August 25, 1941, Serial No. 408,228

10 Claims. (Cl. 33—123)

This invention relates to area measuring machines. While the invention is illustrated with reference to measurement of the superficial areas of hides and skins, it is to be understood that the invention and various important features thereof may have other applications and uses.

In methods and devices heretofore employed in area measuring operations upon sheet material of irregular contour, involving scanning operations performed with the aid of a photocell, it has been necessary to integrate the time intervals during which the scanning beam is on the surface to be measured, or off it, as the case may be. It is well known that time intervals are difficult to integrate accurately. Furthermore, they may be interfered with, either inadvertently or intentionally, with disastrous results with respect to correct measurement of the work piece. If, for instance, the work piece be retarded in its movement past the scanning beam, due to error in the work feeding operation, the exposure to the scanning operation will be lengthened and an incorrect indication of measurement be obtained. It is a distinct advantage of my invention that there is no integration of irregular and interrupted time intervals. On the contrary, my invention depends simply upon the counting of directionally fixed light beams having a regularly spaced relation to each other, by which the area of a work piece may be readily calculated. Furthermore, the photocell and its associated electrical circuits will always respond to the intermittent impulses furnished by the spaced light beams since they are either present or absent, in the latter case being obscured by the work piece on the work backing member. Since no time element is involved, there is no possibility of falsifying the record by displacing the work piece unless it result from deliberate intention.

From one viewpoint, the invention resides in means operative to scan the exposed portions of a relatively extensive work backing or supporting surface for directionally fixed light beams projecting from discrete portions of said surface, in combination with means for counting such light beams.

In a preferred embodiment of my invention, regularly spaced sources of directionally fixed light beams are provided in relation to one side of a work support or backing member so that sheet material to be measured when placed on the work support or properly positioned relatively to the backing member will intercept a greater or lesser number of such light beams in accordance with the size of the work piece. Hence, the uncovered sources of light beams may be readily counted by their effect on a totalizing mechanism, whereby the area of the work piece may be calculated and indicated by means provided for that purpose.

In the illustrated construction, regularly spaced openings or perforations are provided in a work piece backing member so that a source or sources of light at one side of the backing member will result in the projection of directionally fixed light beams through said openings or perforations. Since a work piece, such as a hide or skin, will cut off light beams from the openings or perforations covered by the work piece, the area of the latter may be ascertained by scanning for the beams of light coming through the uncovered openings or perforations, the scanning means being operative to cause the light beams to produce in succession certain effects in a totalizing device thereby to indicate the area of the work piece.

In a preferred embodiment of the invention, a mirror turning about a horizontal axis above the work support performs a scanning operation for successive rows of light beams and concomitantly therewith transmits the results of the scanning operation to a second mirror turning at high speed about a vertical axis to scan the first-mentioned mirror for spaced light beams in each row and to transmit such beams individually to a photoelectric cell serving as an essential element of an indicating means.

It will be understood that a plurality of sets of mirrors will be required for large skins and sides of leather. The disclosed arrangement of mirrors for scanning a work support or work backing member and selecting one or more light beams in each of a plurality of lines of sources of such light beams in an apparatus for measuring stationary pieces of work has the advantage of keeping the movable parts to a minimum, thereby simplifying the structure and reducing the cost of maintenance. However, if it be desired to feed a large piece of work, such as a side of upper leather, an endless traveling band or large drum may be provided with parallel rows of perforations upon which the work piece is placed, the arrangement being such that only one row of perforations is illuminated from below at a given instant. In that case only one mirror is necessary and that is arranged to scan each row of perforations from end to end and to project light beams from any uncovered perforations into a photocell.

These and other important characteristics and features of the invention, together with novel combinations of parts, will now be described in detail in the specification and then pointed out more particularly in the appended claims.

In the drawings,

Fig. 4 is another side elevational view looking at the mechanism of Fig. 2 in the direction of the arrow IV (Fig. 2);

Figure 1:
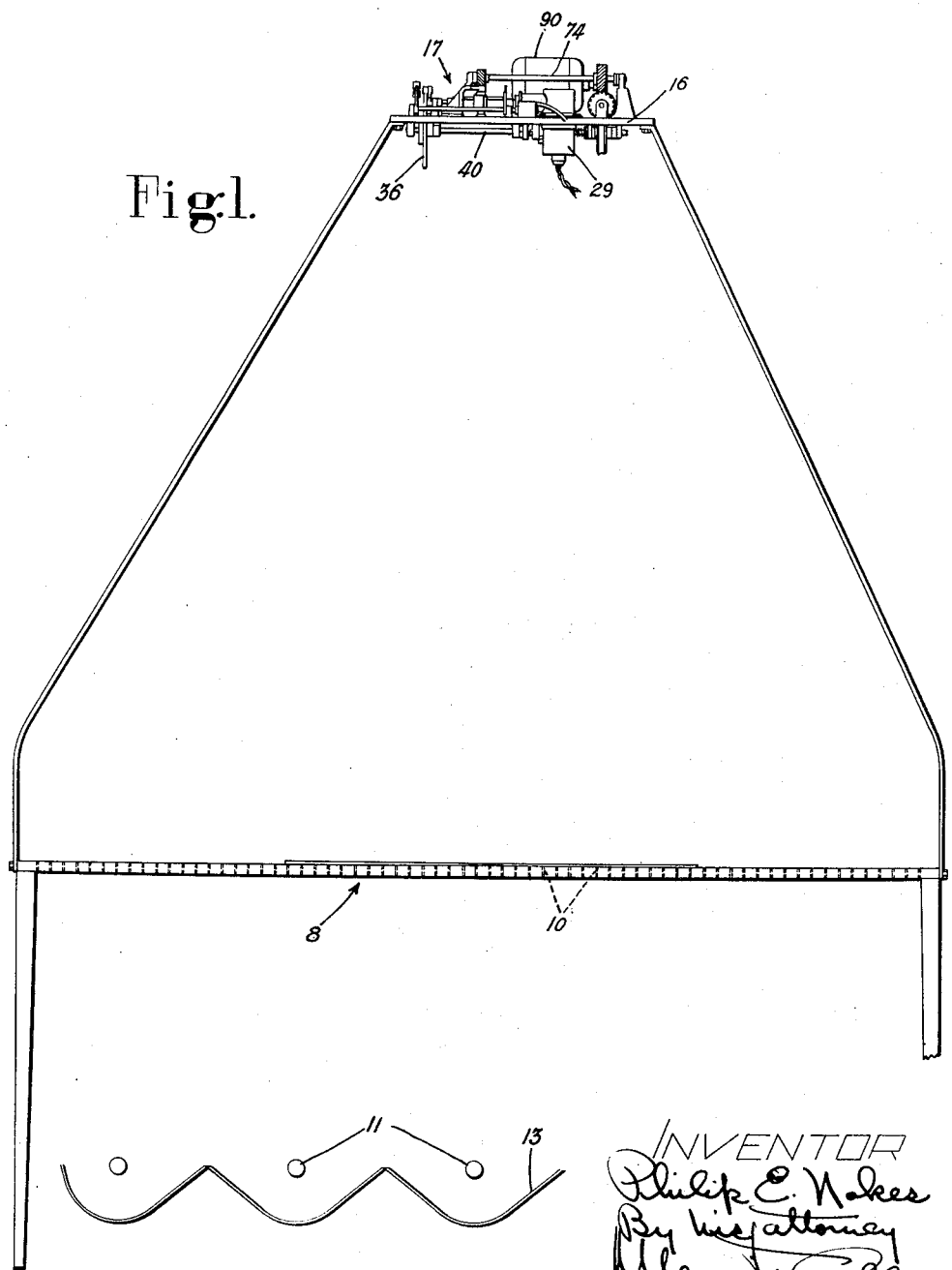
Fig. 1 is a front elevation of an area measuring machine illustrating one embodiment of the invention.

In the illustrated machine, which is specially designed for the measuring of the superficial areas of articles of irregular contour, such as hides and skins, there is provided a work supporting table 8 provided with openings 10 (Figs. 1 and 2) therethrough, the said openings being discrete and arranged in a regular pattern, as in parallel lines or rows. In the illustrated construction, each opening 10 is the center of a square measuring $\frac{1}{10}$ of an inch on each side. Below the table 8 there is placed a plurality of sources 11 (Fig. 1) of light indicated in position above a reflecting surface 13, intended to give substantially uniform illumination of the under surface of the table, with the result that directionally fixed beams of light are projected through each of the openings 10, unless and until some or the greater part of them are covered by the work piece to be measured.

Mounted on a platform 16 at a suitable distance above the table 8 is a scanning mechanism 17 comprising a mirror or other reflector 18 carried by a shaft 20 the axis of which is parallel to the surface of the table 8. Preferably the mirror is so mounted that the axis of the shaft is in the reflecting surface of the mirror. As shown, the shaft 20 extends centrally across an opening in the platform 16 so that as the mirror is rotated it receives in succession beams of light from exposed openings 10 in line after line of such openings not covered by the work piece on the table 8. Mounted on the platform 16 opposite to the transverse median line of the primary mirror 18 is a second mirror 22 rotatable about a vertical axis of a shaft 24, said axis being preferably in the plane of the reflecting surface of the mirror 22. It will be readily understood that a beam of light from one or more of the openings 10 in the table 8 will be projected from the mirror 18 to the mirror 22 and from the latter through a double convex lens 26, located in a tube 27, to a photoelectric cell 28 in a housing 29, the photocell being in an electrical circuit which will hereinafter be described in detail. From one viewpoint, the primary mirror 18 may be said to scan the work support 8 for line after line of beams, while the second mirror scans the primary mirror for individual beams which are directed to the photocell, one by one, through an apertured diaphragm 31.

As heretofore stated, the mirror 18 is mounted on a shaft 20 supported in bearings 30 carried by the platform 16. At one end the shaft 20 has secured thereto a link 32 (Figs. 2 and 3) the other end of which carries a pin upon which is mounted a roller 34 arranged to follow the cam surface of the relatively large cam member 36, the said roller 34 being yieldingly held in contact with the cam by a spring 38. As the cam 36 rotates about the axis of its driving shaft 40, the mirror 18 is rocked first in one direction and then in the reverse direction, the rate of rotating movement being about five per minute whereas the mirror 22 is rotated at about 2000 R. P. M. It will be understood, of course, that the rate of rotary movement of the mirrors 18 and 22 will vary with a number of factors, such as the size of the work support or backing member and the size of its divisions, e. g., in hundredths of a square foot. For instance, a convenient size for the work support 8 in an apparatus specially designed for measuring sheep, kid and calfskins is five by six feet. If now the surface of such work support be divided into sections measuring one-tenth of a foot in each direction and if the axis of the mirror 18 be placed at six and seven-tenths feet above the work support, the said mirror will be arranged to turn about its horizontal axis at the rate of approximately 5 R. P. M., in which case the mirror 22 will be rotated about its axis at the rate of about 2000 R. P. M.

Since the lines or rows of openings 10 extending crosswise of the table 8, i. e., in a direction approximately parallel to the horizontal axis 20 of the mirror 18, are scanned in succession by the mirror 18 rotating on said axis, the requirement is that beams of light from all of the uncovered openings in any given row be projected in a certain way to the mirror 22 turning about its vertical axis 24. In other words, the mirror 18 must project beams from all of the openings in any given row during movement of said mirror 18 in such manner that the reflected beams will all lie in a horizontal plane and thus be sure of passing through the openings 31 to the photocell 28. One way to insure this result will readily occur to anyone skilled in optics and that is to incline the rows of openings 10 with respect to the axis 20 of the rotating mirror 18. Since, however, this inclination is hardly visible on a full sized drawing of the table 8, the amount of the deviation or inclination being only $\frac{1}{10}''$ in the approximately 5-foot width of table, it follows that the inclination is practically invisible when drawn to the scale of Fig. 2 of the drawings. Hence, no attempt was made to show such inclination in the drawings. Instead of inclining the rows of openings with respect to the axis 20 of the mirror 18, it is also possible to make the openings 10 of sufficiently large size so that the inclination becomes unnecessary. In other words, the dimension of each hole (somewhat over $\frac{1}{10}''$ in diameter) is greater than the error produced by lack of inclination in the rows of holes or openings 10.

Also secured to the shaft 40 is a cam member 42 having a low part 44 for the reception of a roller 46 carried at the lower end of a bell crank lever 48 pivoted at 50 to a bracket extending upwardly from the platform 16. At its upper end the lever 48 has pivoted thereto a link 52 the other end of which is also pivotally attached to a lever arm 54 the lower end of which is secured to a shaft 56 to which is secured an arm 58 carrying at its free end a shutter 60 adapted to be positioned between the mirror 22 and the lens 26 when no work piece is in position on the table 8. For holding the shutter 60 yieldingly in its operative position (shown in Fig. 3) there is provided a spring 62 connected to the upper end of the lever arm 54 and to a member 64 rigidly attached to the platform 16.

Figure 2:
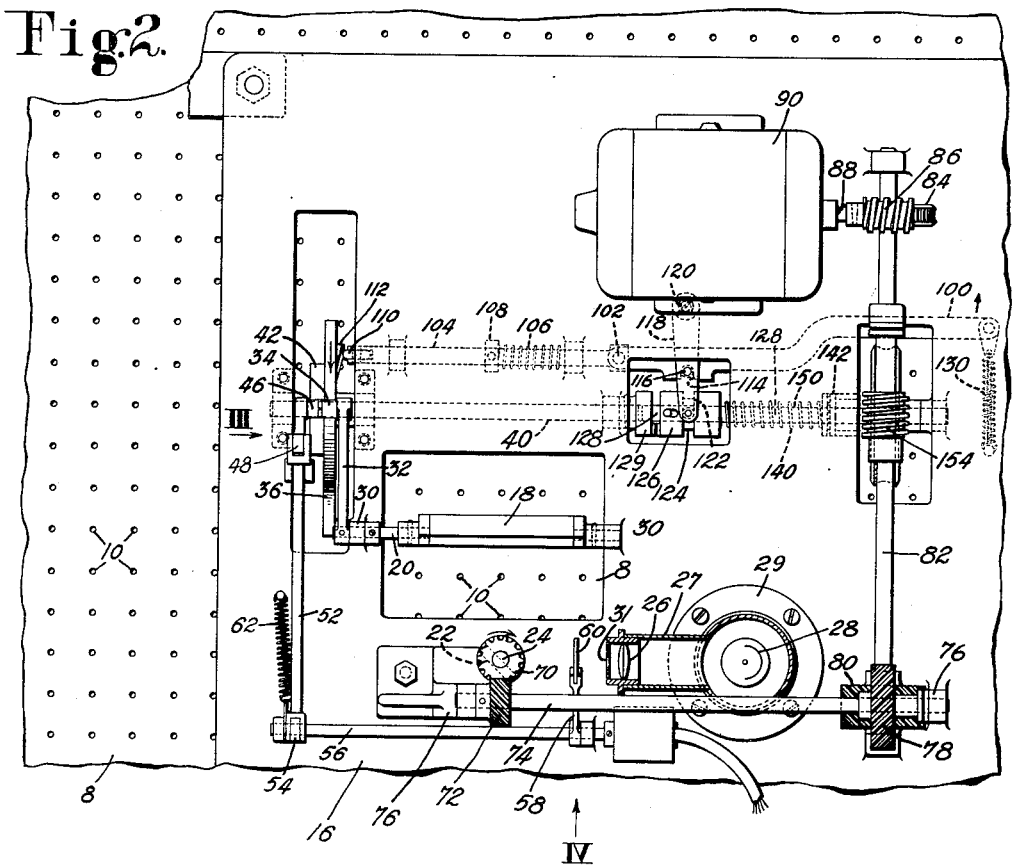
Fig. 2 is a plan view from above of the machine shown in Fig. 1 and particularly of the scanning mechanism.
Figure 3:
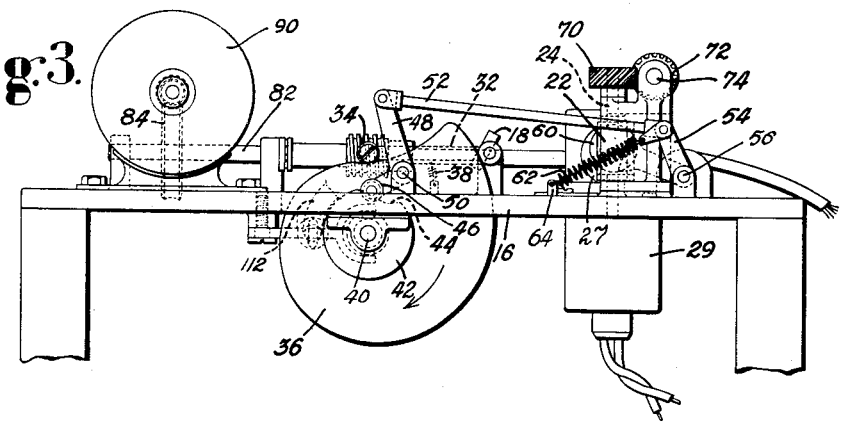
Fig. 3 is a view in side elevation of the parts shown in Fig. 2 looking in the direction of the arrow III in Fig. 2.

As heretofore stated, the mirror 22 is mounted on a vertical shaft 24 (Figs. 2 and 3). At its upper end the shaft 24 has fixedly secured thereto an oblique gear 70 which is arranged to be constantly in mesh with another oblique gear 72 secured to a shaft 74 mounted at its ends in bearings 76 carried by the platform 16. Adjacent its other end the shaft 74 has secured thereto an oblique gear 78 arranged to be constantly in mesh with an oblique gear 80 secured to one end of a shaft 82 having adjacent its other end a worm gear 84 (Fig. 2) in mesh with a worm 86 on armature shaft 88 of an electric motor 90. It will be readily understood then that the shaft 24 of the mirror 22 is rotated at high speed, preferably at about 3000 R. P. M.

Figure 4:
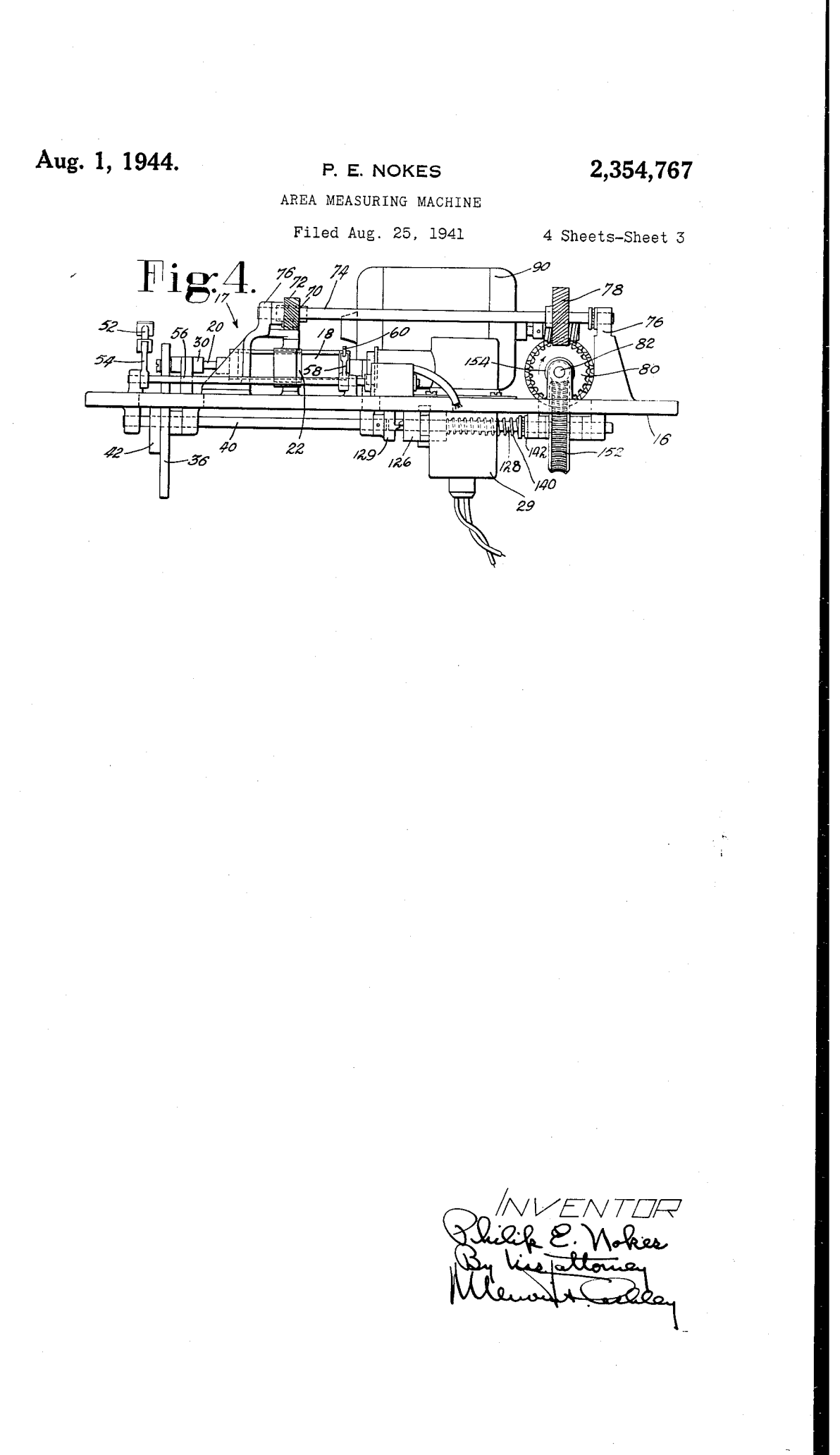

In order that the operator may initiate operation of the scanning mechanism after a work piece has been placed upon the table 8, there is provided a lever 100 (Fig. 2) pivoted at 102 to one end of a shaft 104 slidable endwise in bearings on the under surface of the platform 16, a spring 106 being provided between one of the bearings and a collar 108 fixed to the shaft 104 to urge said shaft 104 constantly toward the left in Fig. 2 to press a roller 110 on the end of the shaft against a face of the cam member 36, the said roller 110 being in the path of a surface cam 112 conveniently carried by the cam member 36. It will be observed that the lever 100 has a slot at 114 for the reception of a pin 116 extending upwardly from a lever 118 pivotally mounted at 120 on the under side of the platform 16. The other end of said lever 118 is forked at 122 and is provided with rolls receivable in a circular recess 124 in a clutch member 126 pinned to a shaft 128 for sliding movement lengthwise thereof. As shown, shaft 128 is mounted in alinement with the shaft 40 in bearings carried by the platform 16 on the lower surface thereof. When moved to the left in Fig. 2, the clutch member 126 engages a second clutch member 129 fixedly secured to the adjacent end of the shaft 40 which carries cam members 36 and 42, as above described. As clearly shown in Fig. 2, the lever 100 is held by a spring 130 with the recess 114 in said lever 100 engaging the pin 116 on the lever 118. When the lever 100 is manually moved in the direction of the arrow in Fig. 2, the pin 116 is disengaged from the slot 114, thus freeing the lever 118 and the clutch member 126 for movement by a spring 140 which is compressed between a stationary collar 142 and the movable clutch member 126. In this way provision is made for clutching the shaft 40 to a source of power represented by the driven shaft 128 (Figs. 2 and 4), which has secured thereto a worm gear 152 arranged to be constantly in mesh with a worm 154 on the shaft 82 constantly driven from the electric motor 90, as above described. When the operator moves the hand lever 100 (Fig. 2) in the direction of the arrow (Fig. 2) the shaft 40 is clutched to the driven shaft 128 in the manner above described with the result that the mirror 18 is oscillated to effect a scanning operation of the work support for light beams from uncovered openings 10. During the time that the mirror 18 is moving, the shutter 60 is held by the spring 62 in its inoperative position. At the end of the rotation of the cam 36 and of the mirror 18 the shutter 60 is moved up to its operative position between the mirror 22 and the photoelectric cell 28 and at the same instant the face cam 112 arrives in position to shove the shaft 104 toward the right in Fig. 2, thereby causing disengagement of the clutch member 126 with respect to the clutch member 129 so that the shaft 40 comes to rest, the clutch member 126 being held in its nonclutching position by engagement of the pin 116 on the lever 118 in the recess 114 of the manually operable lever 100. Hence, at the end of the scanning operation on a given piece of work the mirror 18 comes to rest with the shutter 60 in its operative position cutting off light from the photocell 28. Obviously the purpose here is to prevent access of adventitious light impulses to the photocell after measurement of the work piece has been accomplished.

During scanning of the lighted perforations by the mirror 18, it may reflect beams from one or more perforations in each row of perforations extending parallel to the axis of the said mirror, beams from the successive rows being projected separately from those in front and behind by reason of the fact that the path of all beams reflected from the mirror 18 which impinge on the vertical mirror 22 are parallel to each other and, in the illustrated construction, parallel also to the surface of the table or work support 8.

Since the mirror 22 is turning at high speed, it separates the beams being reflected from the mirror surface 18 along a line extending lengthwise of the latter's axis, it being clear that a beam reflected from one end of the mirror 18 will strike the mirror 22 at a different angle from the beam being reflected from a point nearer to the transverse central line of said mirror. The mirror 22 scans the whole length of any given line of beams showing in proper position on the mirror 18 in one rotation of said mirror 22, as the latter views said line of beams from one end to the other while said mirror 18 continues its scanning movement. Since the mirror 18 scans the whole surface of the perforated table in about ¾ of a second, the vertical mirror must turn at high speed to scan each line of beams appearing on the primary mirror 18. During the scanning movement of the mirror 18, it will happen that beams will be reflected from lighted perforations in two rows instead of in one, this being due to the close spacing of the rows with respect to each other. However, only those beams reach the mirror 22 which are reflected from the mirror 18 along a horizontal path from the latter. This insures that beams from lighted perforations will be reflected by the mirror 18 in row after row and not simultaneously from two or more rows extending substantially parallel to the axis of the mirror.

It will be understood that several scanning devices, including mirror 18 and mirror 22, will be provided in sets and properly combined to take care of large size skins. For instance, in the case of very large areas such as sides for upper leather, a scanning set will be provided above the center portion of each quarter of the work supporting table 8, the arrangement being such that each photocell in turn sends its impulses into the counting mechanism hereinafter described.

Figure 6:
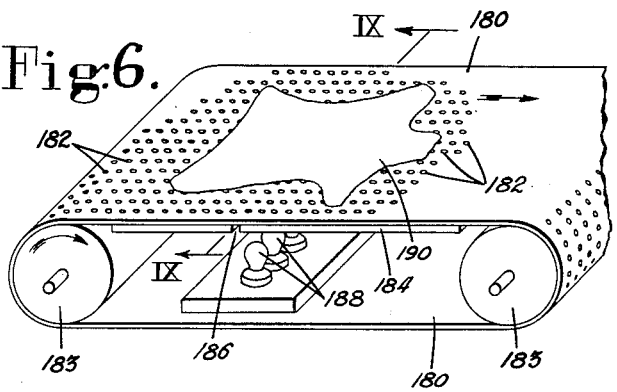
Fig. 6 is a perspective view of a work support mechanism in still another embodiment of the invention wherein provision is made for measuring the area of a work piece during feeding movement thereof.
Figure 7:
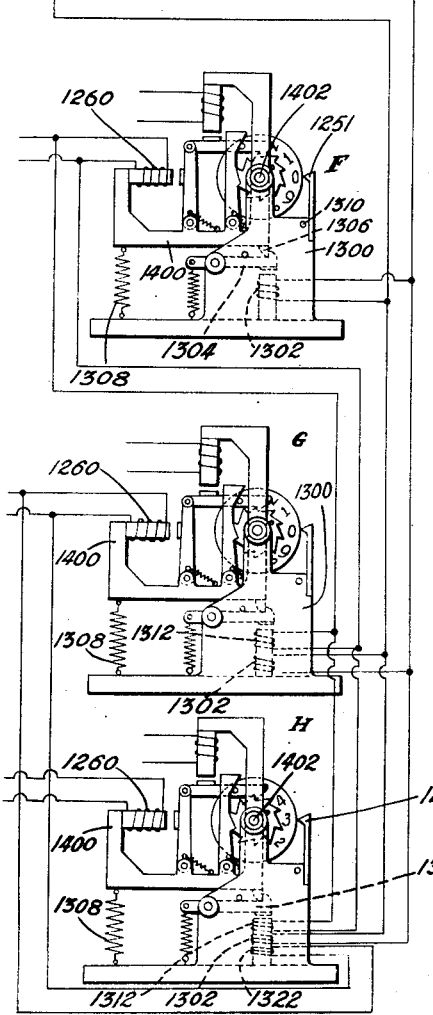
Fig. 7 is a sectional view along the line IX—IX of Fig. 6 showing also diagrammatically the scanning mechanism for this type of machine.
Figure 7:
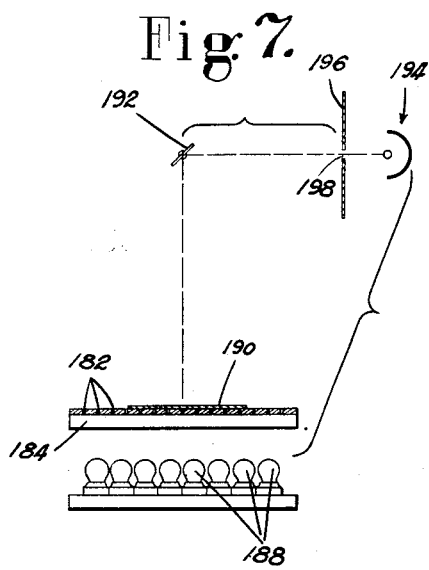

In that embodiment of the invention shown in Figs. 6 and 7 of the drawings, there is provided a movable work support in the form of an endless band or belt 180 having transversely extending rows of perforations 182 and driven by one of the rolls 183. Preferably the belt 180 moves over a table 184 having a slot 186 extending transversely thereof. Below the slot 186, and between the upper and lower runs of the endless belt 180, is located a bank of lamps 188, the arrangement being such that light from the lamps is projected upwardly through the slot 186 and through the row of perforations at the instant over the slot. A piece of work, such as a skin 190, upon the traveling belt 180 will cover many or all of the perforations in each of a plurality of rows of perforations, it being obvious that light will pass through uncovered perforations in each row passing over the slot 186 in the table 184. While a given row of perforations is located above the light slot 186, it will be scanned by suitable means as a preliminary to counting the uncovered perforations.

The scanning means mentioned above comprises, in the illustrated construction, a mirror 192 (Fig. 7) located directly over the slot 186 at a suitable height, the said mirror turning about an axis extending at a right angle to the line of perforations being scanned. During the scanning movement of the mirror, light beams are projected successively from uncovered perforations into a photocell 194, a stationary diaphragm or shutter 196 having an opening 198 of a size and so positioned as to restrict the beams entering the photocell to a single source (one of the perforations 182) at any given instant. The photocell 194 transmits impulses to suitable counting means as hereinafter described.

By reason of the speed of operation of the scanning device the impulses are received from the photocell very rapidly and they are not sufficiently powerful to operate a mechanical counter. Accordingly, these impulses are delivered through an electronic counting circuit to the operating electromagnet of the mechanical counter. A special electronic counting circuit for this purpose is described in my co-pending application Serial No. 408,229, filed August 25, 1941, for improvements in Electrical counters, and involves the use of amplifying circuits and accumulating condensers to which unit charges are delivered by a trigger or charging circuit as each impulse is received from the photocell. At the completion of the counting operation these accumulated charges are delivered by the condensers through discharge circuits to the operating electromagnets 1260 of a registering device such as that illustrated in Fig. 5.

In the type of area measuring machine herein disclosed, the light impulses received by the photocell 28 depend upon the absence, at a particular point, of an article to be measured. Hence it is necessary to subtract the count which has been made from a constant corresponding to the area of the work supporting surface of the machine, only a portion of which is covered by the article to be measured. In the illustrated machine, an impulse may be received by the photocell from each of 3000 squares each of one-tenth of a foot square. Hence, the constant from which subtraction must be made is 3000.

Figure 5:
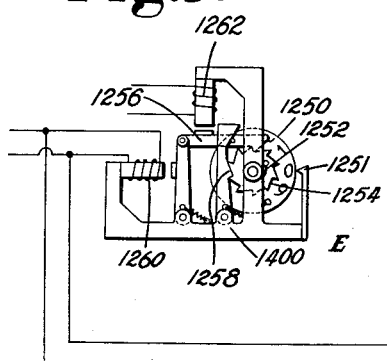
Fig. 5 is a detail of a counter mechanism specially applicable to this machine.

In Fig. 5, the figure wheels 1250 are numbered backwards and are provided with a special correcting device to be described. Inasmuch as the constant is more than one thousand, it will be necessary to provide a counting circuit with an accumulating condenser having a capacity such that it will not be discharged automatically until 10,000 unit charges have been received. This circuit will be connected directly to the operating electromagnet 1260 of a counter H in association with counters E, F, and G. In the counters F, G and H, the frames 1400 are pivotally mounted at 1402 upon a base 1300 in which there is provided a correcting coil 1302 of an electromagnet and the action of this coil is similar to the mechanical carry-over utilized in mechanically interconnected counters. When the coil 1302 is energized, it draws down a latch 1304 engaging a projection 1306 and allows the whole frame 1400 to be drawn down by a spring 1308, thereby tilting the frame 1400 until the projection 1306 strikes a stop pin 1310. This angular tilting movement of the frame 1400 is sufficient to carry the next number on the figure wheel 1250 (rotatable about the axis of pivot 1402) to a position opposite the reference pointer 1251, thus in effect subtracting 1 from the digit to be read on the figure wheel and corresponding in effect to a movement of the reference pointer 1251 a distance equal to the space between successive digits. It will be observed that the return spring 1252 on the counters E, F, and G is arranged to return these figure wheels to zero after the count has been taken. On the other hand, the corresponding spring on the counter H is arranged to return its figure wheel to the number 3, for the reason that the impulses received are to be subtracted from the constant 3,000. In the counter G, there has been provided both the correcting coil 1302, and a coacting and additional coil 1312. In the counter H, three correcting coils 1302, 1312 and 1322 are positioned on the same core and an impulse received by any one of the three is sufficient to release the latch 1304 and to permit the tilting of the corresponding frame 1400 to bring the figure 2 opposite the pointer 1251.

The principle of the corrective action of these coils depends upon the fact that the number which is to be subtracted from the constant 3,000 may vary from 1 to 2999 and the arrangement is such that, when any of the digits in that counted figure which is to be subtracted is a finite number other than zero, then all the digits to be read at the left of it must be corrected by subtracting 1. As shown, the counters E, F, G and H are arranged one above the other so that the operating magnets 1260 may obviously be connected to similar individual discharge circuits (not shown). The final result to be read from the figure wheels will be read from the figure wheels in the counters H, G, F, E from bottom to top.

In accordance with this principle, the coils 1302 in the counters F, G and H are connected to the circuit which energizes the electro-magnet 1260 of the counter E so that a correction of one will be made whenever the number recorded by counter E is one or more than one. Similarly, the coils 1312 are connected to the circuit which energizes the magnet 1260 of the counter F, and the remaining coil 1322 in the counter H is connected to the energizing circuit from a magnet 1260 in the counter G. When no impulses are received in any one of the counters E, F and G, the corresponding correcting coils 1302, 1312 and 1322 will not be energized. On the other hand, the action of these coils is additive so that the energization of any one of them is sufficient to release the latch 1304 of the counters below it which will correspond to the figures to the left of this digit in the final result.

It will be understood that the counting or accumulating and carrying over usually performed mechanically are here done electrically, requiring only the final setting of a group of independent figure wheels 1250 to be done mechanically.

Having described my invention, what I claim as new and desire to secure by Letters Patent of the United States is:

1. An apparatus for measuring the superficial area of sheet material, including a perforated work support or backing member, a source of light at one side of said work support or backing member so that directionally fixed beams of light pass through perforations remaining uncovered by the sheet material undergoing measurement, a mirror turning about an axis parallel to the surface of the work support or backing member upon which beams from the uncovered perforations may impinge, a second mirror arranged to rotate at high speed about an axis at a right angle to the first-mentioned axis, said second mirror receiving the beams from the first mirror in succession during its high speed rotation, and a photoelectric cell positioned to receive said beams from the second mirror and having associated therewith electrical circuits in which the beams entering said photoelectric cell are translated into impulses in said circuits which may be counted.

2. An apparatus for measuring the superficial area of sheet material, including a work support or backing member, a source of light at one side of said work support or backing member arranged to provide directionally fixed beams of light projecting from said member, a mirror turning about an axis parallel to the surface of the work support or backing member to scan the latter for beams from uncovered portions of said member, a second mirror arranged to rotate at high speed about an axis at a right angle to the first-mentioned axis, said second mirror receiving the beams from the first mirror in succession during its high speed rotation, a photoelectric cell positioned to receive said beams from the second mirror and having associated therewith electrical circuits in which the beams entering said photoelectric cell are translated into impulses in said circuits which may be counted in the measurement of the sheet material, power means for rotating the first-mentioned mirror in its scanning movement, and a shutter operated in timed relation to the first-mentioned mirror to intercept adventitious light rays which would otherwise impinge upon said photoelectric cell, said shutter being movable to its operative position at the end of the movement of the first mirror in its scanning operation.

3. An apparatus for measuring the superficial area of sheet material, including a work support or backing member, a source of light at one side of said work support or backing member arranged to provide directionally fixed beams of light projecting from said member, a mirror turning about an axis parallel to the surface of the work support or backing member to scan the latter for beams from uncovered portions of said member, a second mirror arranged to rotate at high speed about an axis at a right angle to the first-mentioned axis, said second mirror receiving the beams from the first mirror in succession during its high speed rotation, a photoelectric cell positioned to receive said beams from the second mirror and having associated therewith electrical circuits in which the beams entering said photoelectric cell are translated into impulses in said circuits which may be counted in the measurement of the sheet material, a cam mechanism having connections to rotate the first mirror about its horizontal axis, a shutter also operated by said cam mechanism to be moved to operative position in front of the photoelectric cell when the first mirror has completed its operative movement, power means comprising a clutch mechanism for operating said cam mechanism, a manually operable member for initiating operation of the clutch to drive said cam mechanism, and means operated by the cam mechanism for disconnecting the clutch at the end of the operative movement of the first mirror, whereby operation of the apparatus is initiated by said manually operable member and automatically terminated at the end of a measuring operation.

4. In an apparatus for measuring the superficial area of sheet material, a relatively extensive movable work support having a plurality of rows of perforations extending in lines transverse to the direction of movement of the work support, a source of light below the movable work support, a mirror located above the work support and arranged to scan each row of perforations from end to end thereof while said row of perforations is moving over the light source, a photocell positioned to receive beams in succession from each row of uncovered perforations scanned by said mirror, and means associated with said photocell to count the beams received as an indication of the area of the sheet material.

5. In an apparatus for measuring the superficial area of sheet material, a movable work support having a plurality of rows of perforations extending in lines transverse to the direction of movement of the work support, a source of light below the movable work support, a mirror located above the work support and arranged to scan each row of perforations from end to end thereof while said row of perforations is moving over the light source, a photocell positioned to receive beams in succession from uncovered perforations scanned by said mirror, a shutter having a perforation therein of a size and so located as to restrict beams entering the photocell to those originating from a single perforation at any given instant whereby successive perforations of each row may be scanned by the movable mirror, and means associated with said photocell to count the beams received as an indication of the area of the sheet material.

6. An apparatus for measuring sheet material including a relatively extensive member for supporting such sheet material in spread-out form, means to project simultaneous and discrete light beams along the length of a narrow strip of said member, said strip being of a length which is more than sufficient to traverse the sheet material, means arranged to scan the length of said strip, and means associated with said scanning means for counting the discrete light beams intercepted by the sheet material as an indication of the measurement of sheet material placed upon the support.

7. An apparatus as set forth in claim 6, in which the relatively extensive member is a conveyor arranged to move the sheet material in one direction whereby the said simultaneous and discrete light beams may pass from the said narrow strip of said member and then from each of succeeding narrow strips of said member.

8. An apparatus for measuring the area of sheet material including a relatively extensive member for supporting sheet material in spread-out form, said member having regularly spaced lines of discrete sources of light beams, a primary mirror mounted to reflect light beams from each of the said successive lines of sources, a secondary mirror mounted to reflect individual light beams reflected from the primary mirror, a photoelectric cell, both of said mirrors comprising a system whereby the individual light beams are directed to the photoelectric cell, and means for counting the beams thus directed as an indication of the area of sheet material placed upon the support.

9. In an apparatus for measuring the area of sheet material, a relatively extensive member for supporting sheet material in spread-out form, means providing regularly spaced sources of directionally fixed light beams in association with the supporting surface of said member, a primary mirror arranged to turn about an axis parallel to the surface of the said member and to receive such light beams, a secondary mirror arranged to rotate at high speed about an axis at an angle with the surface of the said member and to receive beams reflected from the primary mirror, and electrical means including a photoelectric cell to receive and count beams reflected from the secondary mirror as an indication of the area of sheet material placed upon the relatively extensive member.

10. An apparatus for measuring sheet material including a relatively extensive member for supporting such sheet material in spread-out form, means to project simultaneous discrete light beams along the length of a narrow strip of said member, said member being provided with regularly spaced openings through which the said discrete light beams may pass, said strip being of a length which is more than sufficient to traverse the sheet material, means arranged to scan the length of said strip, and means associated with said scanning means for counting discrete light beams as an indication of the measurement of sheet material placed upon the support.

PHILIP E. NOKES.